United States Patent [19]

Stoner

[11] Patent Number: 4,825,757
[45] Date of Patent: May 2, 1989

[54] PLASTIC DECANTER WITH WARMER APPARATUS AND METHOD OF USE

[75] Inventor: Arthur L. Stoner, Signal Hill, Calif.

[73] Assignee: Wilbur Curtis Company, Inc., Los Angeles, Calif.

[21] Appl. No.: 134,142

[22] Filed: Dec. 24, 1987

Related U.S. Application Data

[63] Continuation-in-part of Ser. No. 946,862, Dec. 29, 1986, Pat. No. 4,715,269.

[51] Int. Cl.[4] ............ A47J 31/00; B65D 25/28; F27D 11/00
[52] U.S. Cl. .................... 99/279; 215/100 A; 219/432; 219/433; 220/94 R; 220/94 A; 222/465.1; 426/520
[58] Field of Search ............... 99/279, 280, 281, 282, 99/283, 295, 306, 326; 215/100 A; 219/283, 432, 433; 220/85 SP, 94 A, 94 R; 222/465.1; 426/433, 520

[56] References Cited

U.S. PATENT DOCUMENTS

| | | | |
|---|---|---|---|
| 3,869,968 | 3/1975 | Ihlenfeld | 99/288 |
| 4,094,449 | 6/1978 | Schlegel | 215/100 A |
| 4,104,957 | 8/1978 | Freedman et al. | |
| 4,138,936 | 2/1979 | Williams | |
| 4,145,603 | 3/1979 | Mackay | 219/432 |
| 4,158,125 | 6/1979 | Jones | 219/433 |
| 4,331,067 | 5/1932 | Mysicka et al. | |
| 4,422,442 | 12/1983 | Gutmann | 220/94 A |
| 4,478,349 | 10/1984 | Haverland, Jr. et al. | |
| 4,526,797 | 7/1985 | Stone | 426/520 |

*Primary Examiner*—Robert W. Jenkins
*Attorney, Agent, or Firm*—Fulwider, Patton, Rieber, Lee & Utecht

[57] ABSTRACT

A plastic decanter and method of use having inward sloping side walls and a broad base construction which interfits with a concave-shaped warmer plate mounted in the warming deck of a conventional coffee brewing machine, the decanter receiving freshly brewed coffee from a brewing assembly with the decanter containing over half of the coffee mass below the horizontal midpoint permitting a reduction in the required heat to be generated by the warmer plate heating element for avoiding burning the coffee, while the sloping sidewalls, a closure lid and the tight interfit between the decanter and the warmer plate contribute to a reduction in the air convection heat losses for maintaining the coffee fresh for an extended period of time, the plastic decanter being relatively unbreakable for eliminating a potential hazard while being utilized as a lightweight serving container.

21 Claims, 5 Drawing Sheets

PLASTIC DECANTER WITH WARMER APPARATUS AND METHOD OF USE

RELATED CASES

This application is a continuation-in-part to the application having the Ser. No. 946,862 and filed on Dec. 29, 1986, now U.S. Pat. No. 4,715,269.

BACKGROUND OF THE INVENTION

This invention relates generally to coffee brewing systems, and more particularly, to a brewing decanter having a unique broad based design for mating with a low temperature controlled warmer plate.

In the past, coffee makers normally used decanters formed entirely of glass or metal, or a combination of metal and plastic. Both glass and metal have a high heat transfer coefficient which causes a substantial heat loss through the walls of the decanter. As a result of such high heat losses, it is necessary to maintain a relatively high temperature on the warmer element to maintain the coffee at a sufficiently high temperature for consumption.

Plastic decanters have also been employed in the past for use in coffee brewing machines. Since plastic has a lower heat transfer coefficient, it is a more desirable material for minimizing the heat loss through the side walls of the decanter. However, the rate of heat transfer through the bottom surface of the decanter from a relatively flat warmer plate is much lower than with a glass or metal decanter.

Since plastic decanters of the past exhibit a high resistance to heat transfer through the bottom wall, the warmer plate temperature necessary to maintain the coffee at the desired temperature potentially could melt or deform the plastic decanter. Further, heating of the coffee to such high temperatures in the localized area immediately adjacent the bottom wall has a detrimental effect on the taste of the coffee. Therefore, there exists a need for a coffee warmer plate and a plastic decanter having a low coefficient of heat transfer with a relatively large heating surface for cooperating with the warmer plate and for providing efficient heat transfer therebetween.

In addition, most decanters of the past do not include a cover or lid so that the pouring spout of the decanter is exposed to ambient air when the decanter is filled and stored with a quantity of warm coffee. As a result, a substantial amount of heat escapes from the coffee to the ambient air currents circulating across the opening of the pouring spout of the decanter. The heat losses are further increased when the coffee brewing machine is exposed to air currents in an air conditioned room or office building. The steam moisture escaping from the open pouring spout of the decanter carries with it the aroma and taste leaving the coffee stale and bitter in approximately thirty minutes.

It has been common practice in the past to manufacture coffee brewing machines with a plurality of warmer plates which are formed with upturned or open headed peripheral rims for retaining the coffee decanter generally centered thereon and for acting as a cooling vent for dissipating heat to the atmosphere. This design assists in maintaining the adjacent peripheral walls of the warmer plates at a relatively cool temperature. The surfaces adjacent to the warmer plates and the heating elements are identified as the "warming deck".

Generally, the upturned open head peripheral rims of the warmer plates do not physically contact the warming deck, but form slots therebetween for limiting the surface temperature of the warming deck to less than, for example, 270° F. Such a requirement is a safety related feature and must be satisfied before a seal of approval from an independent testing laboratory, for example, such as Underwriters Laboratories will be granted. However, such warmer plates are normally shallow and not designed to afford a close fit with the decanter to produce a sufficiently high rate of heat exchange therebetween for permitting the use of a plastic decanter.

Coffee brewing machines have been known in the past to include a carafe or decanter which was positioned on a metal warmer plate and which included an unturned ring portion within which the bottom of the carafe was closely received. A heating element was contained within a shroud mounted to the underside of the warmer plate. The carafe was comprised of a transparent plastic body equipped with a handle and pouring spout with the bottom of the carafe preferably a plate fashioned out of aluminum or other metal having high thermal conductivity. The plate was stake rolled and sealed in a leakproof fashion while the bottom of the carafe plate was formed in a manner for seating closely within the warmer plate ring. The flat underside of the carafe was seated flush on top of the flat surface of the warmer plate and was shaped to assure a close fit within the warmer plate ring for providing a maximum surface area contact with the warmer plate.

Decanters fabricated from the combination of the plastic upper portion and the thin walled metallic lower portion were also developed to help overcome the safety problems associated with glass decanters. A common problem is one in which an empty glass decanter is left on a warmer plate. What generally results is the rapid heating of the bottom glass surface which causes thermal expansion and loss of temper of the glass. The weakened bottom of the glass decanter can possibly break off after thermal expansion and loss of temper of the glass occurs. However, the weakened bottom of the glass decanter also could fracture and separate from the body of the decanter at some time later when the decanter is filled with coffee. While elminating some of the danger associated with glass decanters, the metal bottom of the plastic metal decanter actually accelerated the heat transfer causing rapid deterioration of the coffee flavor.

Heretofore, it was not generally recommended that plastic decanters be placed on warmer plates because of the relatively low heat transfer coefficient. It was believed that the plastic bottom would melt when placed on a warmer plate having a sufficiently high temperature to maintain the volume of coffee at the desired temperature. Typically, the warmer plate is a flush mounted flat unit which may be slightly concave such as a shallow dish for loosely receiving the bottom of the decanter. Because of this construction, air currents passing over the warmer plate will cause additional heat loss from the bottom of the decanter and from the surface of the warmer plate. Thus, the efficiency of the heat transfer from the warmer plate to the decanter is reduced.

Generally, coffee must be maintained at an optimum temperature in order to produce the proper flavor and taste. This optimum temperature is typically 180°. Because of heat losses and inefficient heat transfer which occurs in existing coffee makers, the warmer plate must often be kept at a temperature within the range of (350°–400)° F. to maintain the coffee at the desired temperature. This results in hot spots being produced on the bottom of the decanter at the locations in which the decanter bottom contacts the warming plate. This further results in the deterioration in the flavor of the coffee and becomes pervasive as the coffee circulates throughout the decanter by thermal convection caused by temperature gradients.

The hot spot problem is exacerbated when the warmer plate is formed of a material having a relatively low thermal conductivity. Because of the material employed in the construction of the warmer plate, heat generated by the heating element does not distribute evenly across the bottom of the decanter. Rather, the heat builds up in regions which are directly adjacent to the heating coils under the warmer plate. This problem also results in temperature gradients further deteriorating the flavor of the coffee.

Efforts in the past to solve this overheating problem have lead to the proposal that coffee warmers incorporate a water reservoir for maintaining the temperature of the water at about 200° F. Since stored heat is dissipated by the coffee in the decanter by the convection transfer process, it was theorized that surrounding the decanter with 200° F. water within the reservoir or jacket would maintain the coffee temperature at the desired level. However, use of a glass decanter with such coffee warmers resulted in dissipation of heat to the atmosphere at such a high rate that the temperature of the coffee fell below the palatable level.

Further, coffee decanters made of plastic material have been known for use in microwave coffee makers. For example, a coffee brewing machine for making coffee by the drip method in the past comprised a reservoir containing a thermally controlled valve adapted to open at a predetermined temperature. The thermally controlled valve was heated by water in a reservoir which was subjected to microwave radiation allowing the water to flow out of the reservoir and into and through coffee grounds in a filter beneath the valve. In that application, the selection of plastic materials for the decanter was dictated by a requirement for microwave transparency and not for thermal insulative characteristics.

Generally, decanters of the past including the decanter described in the copending patent application having Ser. No. 06/946,862 filed on Dec. 29, 1986 by Arthur L. Stoner entitled COFFEE MAKER WITH PLASTIC DECANTER AND LOW TEMPERATURE WARMING PLATE, have outwardly extending sides. The outwardly extending sides of the decanters of the past resulted in the volume of the liquid that was being heated was disposed well above the heating element. The extending sides of the decanters were exposed to cooling air resulting in loss of heat by convection heat transfer.

Commercial decanters of the past have been made of either glass or metal which have higher heat transfer coefficients resulting in substantial heat loss through the decanter walls. It was therefore necessary to maintain a relatively high temperature on the heating element to retain the coffee at approximately 180° F. Since plastic decanters have a lower heat transfer coefficient than either glass or metal, the actual measurable heat transfer from the heating element to the coffee was lower for the plastic decanter. This required the heating elements to be maintained at approximately 380° F. to provide coffee at approximately 180°. However, plastic decanters of the past fashioned in conventional round configurations would soften and begin to melt at approximately 350°. Therefore, plastic material was considered unsuitable for conventional round configurated decanters.

Hence, those concerned with the development and use of coffee brewing machines of the commercial variety have long recognized the need for improved plastic broad-based decanters which cooperates with a larger warming plate having a deeper concave construction for providing a closer fit with the plastic decanter permitting the use of lower heat levels and more efficient heating of the stored coffee and which reduces air convection heat losses and potential hazards to brewing machine operators. The present invention fulfills all of these needs.

SUMMARY OF THE INVENTION

Briefly, and in general terms, the present invention provides a new and improved plastic decanter and warmer plate construction within a coffee brewing machine which substantially reduces the heat level required to be produced by a heating element, and which significantly increases the heating efficiency over similar types of coffee decanters and warmer plates by reducing the heat loss to the ambient air. Moreover, the plastic decanter construction of the present invention is relatively unbreakable and includes a wide base for an increased heating surface permitting the volume of coffee to be closer to the heating element, and requires the heating element to be heated only to 260° F. for avoiding coffee overheating while the warmer plate features a deeper concave construction for providing a closer fit to the plastic decanter which reduces air convection heat losses keeping the coffee fresh for an extended period of time.

Basically, the present invention is directed to an improved coffee decanter and warmer plate combination and method of operation for reducing the required level of heat to be produced by the warmer plate and for increasing the heating efficiency between the warmer plate and the plastic decanter by reducing the heat loss to ambient air. This is accomplished by modifying the design of the plastic decanter which permits the mass of coffee being heated to be disposed closer to the warming element and by designing the base of the decanter to closely interfit with the warmer plate.

In accordance with the invention, the wide base diameter of the plastic decanter is designed to closely interfit with the deep concave construction of the warmer plate permitting a greater surface area of the decanter base to be exposed to the warmer plate and the heating element. The decanter tapers inwardly above the warmer plate resulting in the mass of coffee being heated within the decanter to be disposed closer to the heating element. This design results in a more even heat distribution to the coffee minimizing hot spots. The construction also results in the reduction of air convection heat loss since the concave shaped rim of the warmer plate guides the heated air from the heating element upwardly along the sides of the conically-shaped decanter. The top closure lid facilitates in reducing heat loss and contributes to maintaining the coffee fresh for an extended period of time.

In accordance with the improved method of the present invention, as the heated water passes through the coffee retainer assembly located above the plastic decanter of the coffee brewing machine, coffee droplets are directed to and received by an aperture located in the closure lid of the plastic decanter. The plastic decanter is seated on the warmer plate and is retained in position by the concave shaped rim. Because the decanter is comprised of plastic, the heating element need be maintained only at approximately 260° F. to maintain the coffee at approximately 180° for consumption. Because plastic exhibits a low coefficient of heat transfer, heat loss through the walls of the decanter is minimized. Therefore, the close interfit between the plastic decanter and the warmer plate in combination with the reduced heat loss feature of the plastic decanter result in a more efficient heating surface for avoiding burning the coffee.

The new and improved plastic decanter and warmer plate and the method of use of the present invention substantially reduces the required level of heat produced by the warmer plates and significantly increases the heating efficiency over similar types of prior art decanters and warmer plates by reducing the heat lost to the ambient air. The new decanter reduces heat loss through the side walls due to the plastic construction and includes a wider base for an increased heating surface. The wider base decanter permits employing lower temperatures and closely interfits with the warmer plate having a deep concave construction. This construction requires less heat to raise the temperature of the contents of the decanter. The deeper concave construction and a rolled lip circumference reduce convection heat loss by directing the heat upwardly over the sides of the decanter. Further, the closure lid retains the heat transmitted to the coffee further increasing the efficiency of the apparatus.

These and other features and advantages of the invention will become apparent from the following more detailed description, when taken in conjunction with the accompanying drawings, which illustrate, by way of example, the features of the invention.

DETAILED DESCRIPTION OF THE PREFERRED EMBODIMENT

As shown in the drawings for purposes of illustration, the invention is embodied in a plastic decanter 10 in combination with a concave-shaped warmer plate 12, each of the type found in a coffee brewing apparatus, the plastic decanter having a broad base 14 with inwardly sloping side walls 16 culminating in a closure lid 18, and the warmer plate having a rolled lip circumference 20 for interfitting with the broad base of the decanter for efficiently transmitting heat to the contents of the decanter while employing lower heating temperatures and reducing heat loss by convection.

Coffee makers of the past normally employ decanters comprised entirely of glass or metal, or a combination of metal and plastics, each having a high heat transfer coefficient resulting in substantial heat loss through the walls of the decenter. Thus, heating element temperatures required for heating the coffee was necessarily high. Decanters comprised of plastic have a lower heat transfer coefficient and are thus a more desirable material for minimizing heat loss through the side walls. However, heat transfer through the bottom surface of the decanter on a flat surface is much lower than with glass or metal.

Since plastic decanters have characteristically had a high resistance to heat transfer through the bottom wall, temperatures necessary to maintain the coffee at the desired temperature could damage the plastic and did have a detrimental effect on the taste of the coffee. Further, most decanters of the past included an uncovered pouring spout which surrendered much of the heat generated by the warmer plate to the ambient air currents circulating across the opening of the spout leaving the coffee stale and bitter in a short period of time.

The warmer plates of coffee brewing machines of the past are generally formed with upturned or open head peripheral rims for retaining the decanter generally centered thereon and for acting as a cooling vent for dissipating heat to the atmosphere. Such warmer plates are normally shallow and not designed to afford a close fit with the decanter for producing the sufficient rate of heat exchange therebetween for permitting the use of a plastic decanter. However, some coffee brewing apparatus have included a carafe or decanter which was positioned on a metal warmer plate and included an upturned ring portion within which the bottom of the carafe was closely received. The heating element was contained on the underside of the carafe with the carafe being comprised of, for example, a transparent platic body equipped with a handle and a pouring spout. The bottom of the carafe was preferably a plate fashioned out of aluminum or other metal having high thermal conductivity. The flat underside of the carafe was seated flush with the flat surface of the warmer plate so as to assure a close fit for providing maximum surface area contact.

Decanters fabricated from the combination of a plastic upper portion and a thin walled metallic lower portion were developed to overcome safety problems associated with glass decanters. Overheating of an empty glass decanter can cause thermal expansion and loss of temper of the glass resulting in fracture of the weakened portion. However, the plastic and metal decanter actually accelerated the heat transfer causing rapid deterioration of the coffee flavor. Further, it was believed that the bottom of plastic decanters would melt when placed on a warmer plate operated at a temperature sufficiently high to maintain the coffee flavor.

Warmer plates of the past have typically been a flush mounted flat unit being slightly concave for loosely receiving the bottom of the decanter. Therefore, air currents passing over the warmer plate cause additional heat loss from the bottom of the decanter reducing the efficiency of the heat transfer. Because of these heat losses, the warmer plate must often be kept at a temperature within the range of (350°–400)° F. resulting in hot spots produced on the bottom of the decanter. Because of the material employed in the construction of the warmer plates of the past, heat generated by the heating element is not evenly distributed and builds up in the regions adjacent to the heating coils resulting in temperature gradients further deteriorating the flavor of the coffee.

Past efforts to solve these overheating problems included incorporating a hot water reservoir within coffee warmers to keep the coffee hot by heat transfer. However, this proposed solution resulted in dissipation of heat to the atmosphere at a high rate dropping the temperature of the coffee below palatable level. Further, plastic decanters have been previously used in microwave coffee makers. However, the selection of plastic materials in that case was dictated by a requirement for microwave transparency and not for thermal insulative characteristics. Additionally, the outwardly extending sides of decanters of the past required the liquid being heated to be disposed well above the heating element. This resulted in additional heat losses by convection. Further, plastic decanters of the past have had lower heat transfer coefficients than that of glass or metal and the temperature drop betwen the heating element and the coffee was substantially high. Therefore the heating element was required to be maintained at a temperature sufficiently high when ultimately resulted in softening and melting the plastic decanter.

Figure 1:
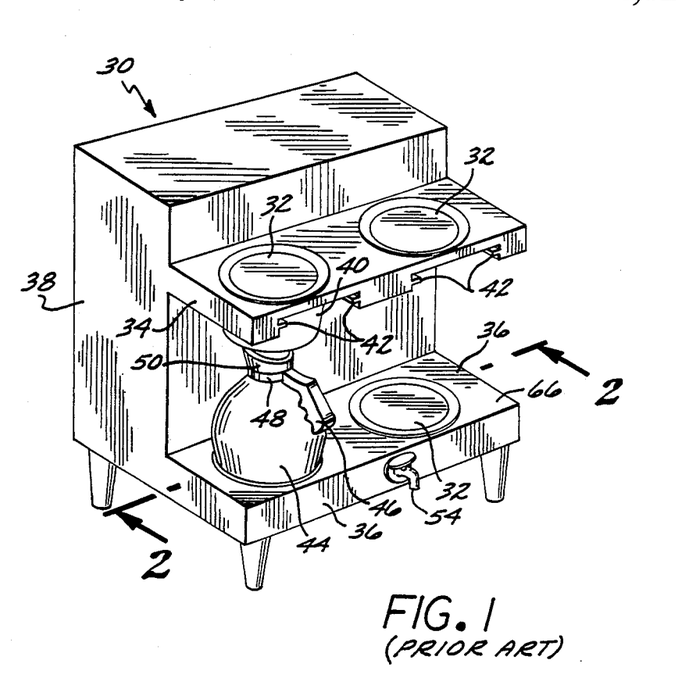
FIG. 1 is a perspective view of a coffee brewing machine employing a decanter and a warmer plate of the prior art.

A coffee brewing machine 30 of the past may have included up to four warmer plates 32 evenly distributed on a top shelf 34 and a bottom shelf 36. The top and bottom shelves 34, 36 were integrally connected to a housing 38 which enclosed a separate system for directing heated water through a retainer assembly 40 for holding fresh coffee grounds as is illustrated in FIG. 1.

Figure 2:
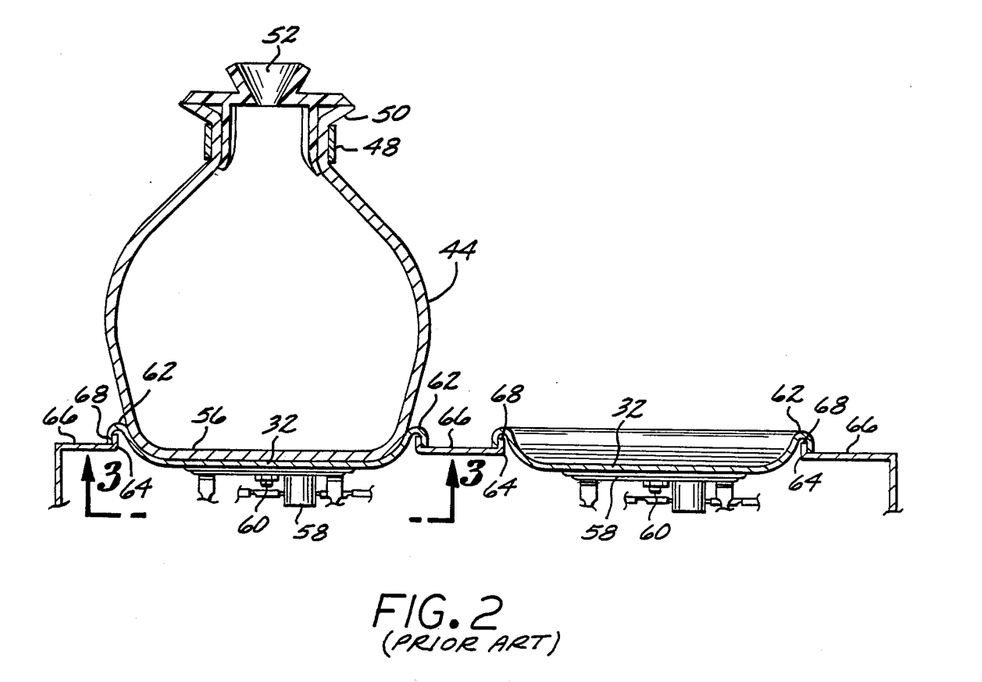
FIG. 2 is a cross-sectional view of the coffee brewing machine taken along the line 2—2 of FIG. 1.

The two warmer plates 32 located on the top shelf 34 each include a heating element (not shown) for retaining coffee at a predetermined temperature. Conversely, the warmer plates 32 located in the bottom shelf 36 are designed specifically for making coffee. The retainer assembly 40 is supported by a pair of horizontally extending guides 42 which engage a receiver means (not shown) for suspending the retainer assembly directly above a decanter 44. It should be understood that the decanter 44 is a prior art decanter referred to here for illustrative purposes only and is not the (plastic decanter 10) invention. The decanter 44 includes a handle 46 attached to the decanter by a metal band 48 which surrounds the neck 50 of the decanter. Also included is an opening 52 for receiving the coffee droplets from the retainer assembly 40 as is shown in FIG. 2. The bottom shelf 36 further includes a spigot 54 which provides hot water for brewing other consumable items, for example, tea or soup.

The decanter 44 is shown having a generally special shape and includes a narrow base 56 which is seated within one of the plurality of warmer plates 32. The warmer plate is physically connected to a heating element 58 by one of a plurality of mechanical fasteners. Each of the warmer plates 32 include a generally concave surface which terminates in a rolled rim 62. The rolled rim 62 is somewhat hook-shaped and fits over a vertical edge 64 of a warming deck 66. Note that a gap 68 is formed between the terminal end 64 and the warming deck 66 to permit the dissipation of heat away from the warming deck to eliminate the possiblity of hazardous burns to operating personnel. Additionally, the housing 38 is supported at each of its four corners by one of a plurality of stilts 70.

Figure 3:
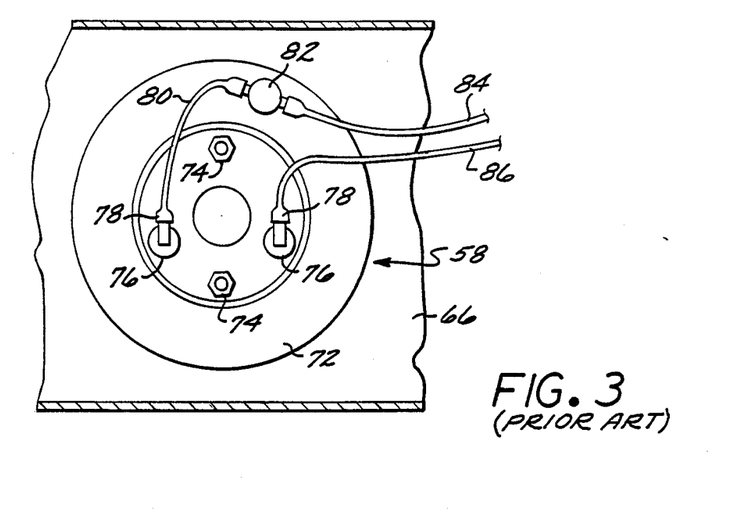
FIG. 3 is a cross-sectional view of the coffee brewing machine taken along the line 3—3 of FIG. 2.

Located below each of the respective warmer plates 32 is the heating element 58 which is illustrated in FIG. 3. The heating element 58 is comprised of a toroidal ring 72 which is mounted to the bottom of the warmer plate 32 by a plurality of mechanical fasteners 74. Also mounted at the base of the toroidal ring is a pair of heating terminals 76 which are connected to the electrical portion of the heating element 58. Connected to each of the pair of heating elements is one of a pair of electrical terminal ends 78. Secured to a first of the pair of electrical terminal ends 78 is one end of a switched conductor 80. The opposite end of the switched conductor 80 is connected to the first end of the thermostat 82 employed to control the flow of electrical current to the heating element 58. The second end of the thermostat 82 is connected to a first source electrical conductor 84 while a second source electrical conductor 86 is conducted to the second of the pair of electrical terminal ends 78. The first and second source electrical conductors 84, 86 are then connected to an electrical source (not shown).

The heating element 58 including the toroidal ring 72 is mounted into the warming deck 66 which comprises the top surface of each of the top shelf 34 and the bottom shelf 36 as illustrated in FIGS. 1 and 2. In operation, the thermostat 82 acts as a normally closed switch and remains in the closed position to permit electrical current to flow to the heating element 58 increasing the temperature of the warmer plate 32. The thermostat 82 is designed to certain operating parameters and will open circuit once the heating element reaches a specified temperature.

After the thermostat circuit is open, the heating element 58 will then be deenergized and the heat supply to the warmer plate 32 will be discontinued. Once the temperature of the heating element 58 drops below a specified design level, the switching mechanism within the thermostat 82 will operate closing the electrical circuit and permitting electricity to flow between the first and second source electrical conductors 84, 86 to the heating element 58. As the temperature of the heating element increases, the surface temperature of the warmer plate also increases providing heat to the contents of the decanter 44. The heating element may be designed to operate with any one of a plurality of available electrical voltages and amperatures available.

Figure 4:
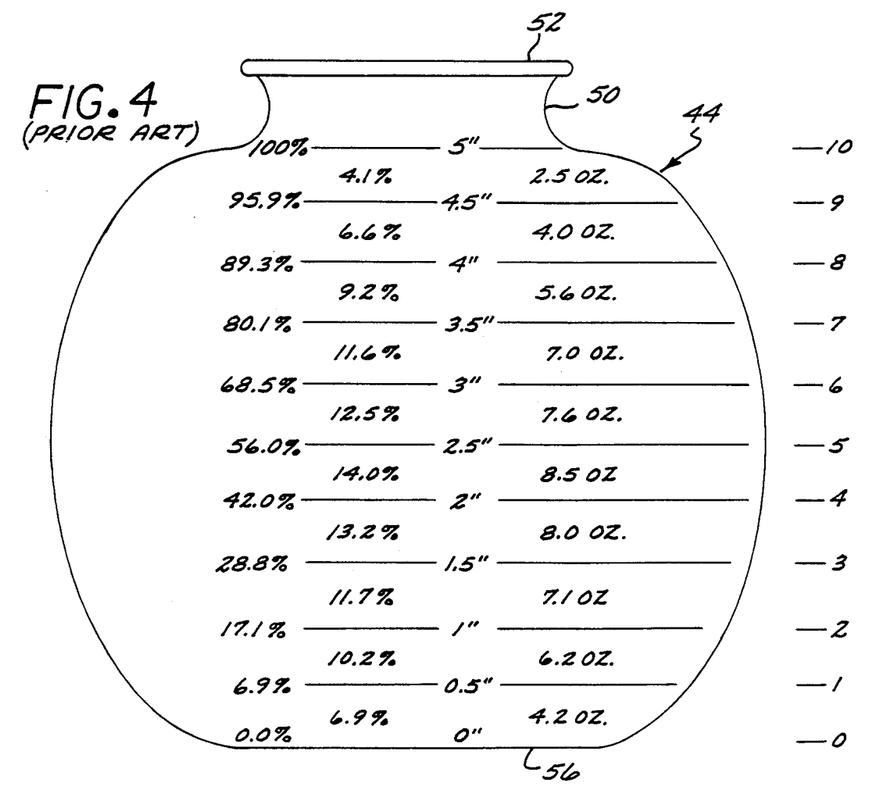
FIG. 4 is a front elevational view of the decanter of FIG. 1.

The decanter 44 of the prior art is generally spherical in shape having the narrow base 56 which is geometrically flat and the neck 50 which leads to the opening 52, examples of which are shown in FIGS. 2 and 4. The decanter 44 of the past measured approximately 5" in the vertical direction from the narrow base 56 to the bottom of the neck 50. When completely filled, the decanter 44 includes approximately 60.70 ounces of volume. The distribution of the volume of the fluid contained in the decanter 44 may be determined by dividing the height of the decanter into stations with a station number assigned to each additional half inch of vertical height. Therefore, decanter 44 includes stations zero through ten as is illustrated in FIG. 4. For example, the first station is located near the narrow base 56 and includes only 6.9% of the total cumulative volume of the decanter which translates into 4.2 ounces of coffee. Because the decanter 44 is generally spherical in shape, the greater pecentages of cumulative volume are located between station numbers two and seven with each including at least seven ounces for each station.

As can be seen from the illustrative divisions of FIG. 4, most of the volume of fluid contained in decanter 44 is located well above the warmer plate 32 requiring the heating element 58 to be kept at a higher temperature for longer periods of time resulting in inefficient electrical operation. In particular, decanter 44 is one of a plurality of prior art decanters manufactured by the instant applicant and is generally identified as a disposable bowl design for containing sufficient volume for twelve cups which is approximately sixty ounces of coffee. Although decanters manufactured by other manufacturers will vary somewhat in construction, the spherical shape illustrated in FIG. 4 is generally common of decanter construction of the past. It is obvious from these illustrations that much of the heat generated by the heating element 58 and transmitted to the decanter 44 via the warmer plate 32 is lost through the side walls by convection or through the opening 52 by laminar flow. There is a need for a new decanter construction to address these problems.

In accordance with the present invention, the geometrical shape of the plastic decanter 10 and the concave-shaped warmer plate 12 cooperate to reduce the heat level required to be produced by the heating element 58 and to significantly increase the heating efficiency of the decanter-warmer plate interface by providing the broad base 14 for the decanter which interfits with the concave shape of the warmer plate and by providing the inward sloping decanter side walls 16 and the closure lid 18 for reducing the heat loss to the ambient air. Further, the plastic decanter construction is relatively unbreakable, the broad base heating surface of the decanter permits the volume of coffee to be closer to the heating element, requires the warmer plate to be heated only to 260° F. and maintains the coffee fresh for an extended period of time by reducing the air convection heat losses.

The plastic decanter 10 is comprised of a configuration which is more conical than spherical. The decanter is comprised of a single piece of polysulfone which is heat resistant to approximately 320° F. but begins to soften at approximately 350° F. The material is relatively inert minimizing any chemical mixing or combining of the plastic with the coffee within the decanter. Further, the polysulfone is resilient and flexible and relatively upbreakable compared to glass. Further, the material absorbs a minimal amount of water. However, the surface may include a corrugated design embodied within the plastic. After extensive use of the decanter, the corrugated design on the decanter may have a tendency to discolor from the coffee. Therefore, as with all other food preparation and serving containers, it is advisable to wash the corrugated surface of the decanter with a brush in warm soapy water.

The decanter is formed by an injection blow molding process which permits the adaptation of the unique conical shape. It is not possible to form the decenter in a single piece by known injection molding processes because the injection mold could not be retrieved from inside the molded decanter due to the narrow radius of curvature replacing the neck of previous known decanters.

Generally, the wall thickness of the polysulfone plastic is approximately one-sixteenth of an inch (0.0625" equivalent), however, the curved surfaces can be somewhat thinner. This wall thickness appears to be the optimum since greater wall thicknesses prove to be uneconomical and thinner wall thicknesses are subject to collapsing due to excessive stress. The outer diameter of the broad base 14 is approximately 5.3 inches while the useful height of the decanter is approximately 4.5 inches. The dimensions should be compared with the base diameter of approximately three inches and a useful height of approximately five inches for the spherical-shaped decanters of the past.

Based on these approximate dimensions, the area of the base of the plastic decanter 10 is within the range of twenty to twenty-one square inches, while the approximate area of the base of decanters of the past was within the range of eight-and-half to nine-and-half square inches. Therefore, the area of the base of the plastic decanter 10 has been increased by two-fold for providing more heating area and for reducing the surface area of the inwardly sloping side walls 16. By reducing the surface area, the heat lost through the side walls exposed to the ambient air is minimized. The surface area of the side walls is minimized because the decanter 10 is more of a conical shape than a global or spherical shape. Because the decanter 10 is comprised of plastic which has a lower coefficient of heat transfer, the heat flow through the side walls of the plastic is reduced. Therefore, it is easier to maintain the temperature of the coffee within the plastic decanter.

During the injection blow molding process, a spout 102 is integrally formed with the sloping side walls 16 at the narrow radius of curvature 100. The back end of the spout extends above the radius of curvature while the front end increases in height until an extended lip 104 is formed at the front of the decanter. The extended lip 104 serves to act as a channel or guide for transmitting the coffee, for example, a cup when the decanter is titled as in pouring.

Figure 5:
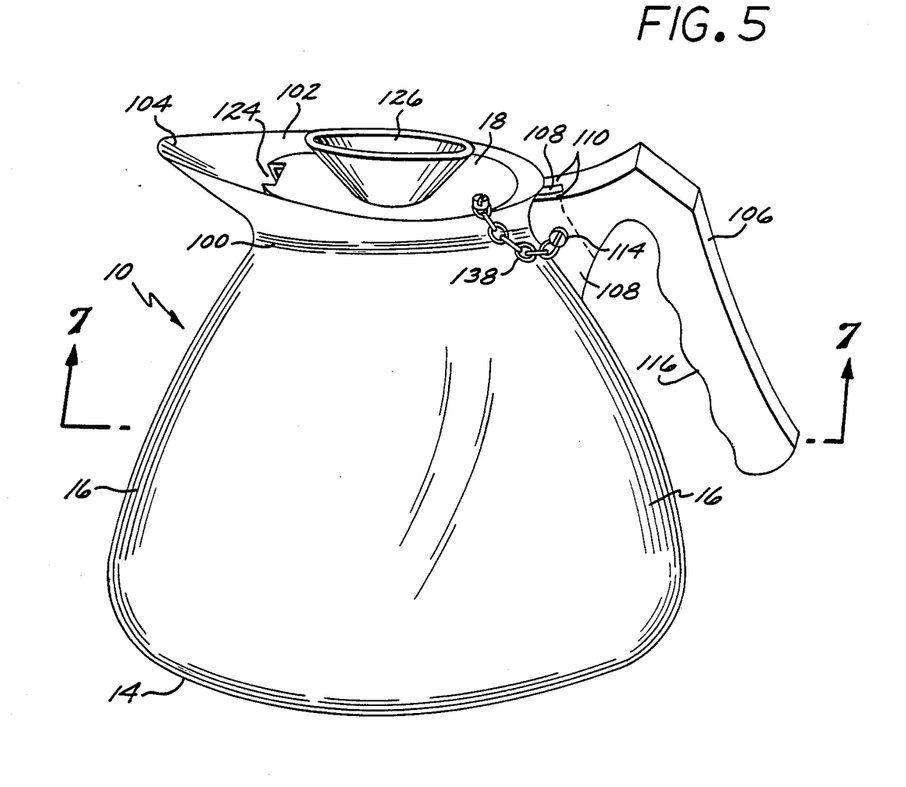
FIG. 5 is a perspective view of a decanter in accordance with the present invention.
Figure 6:
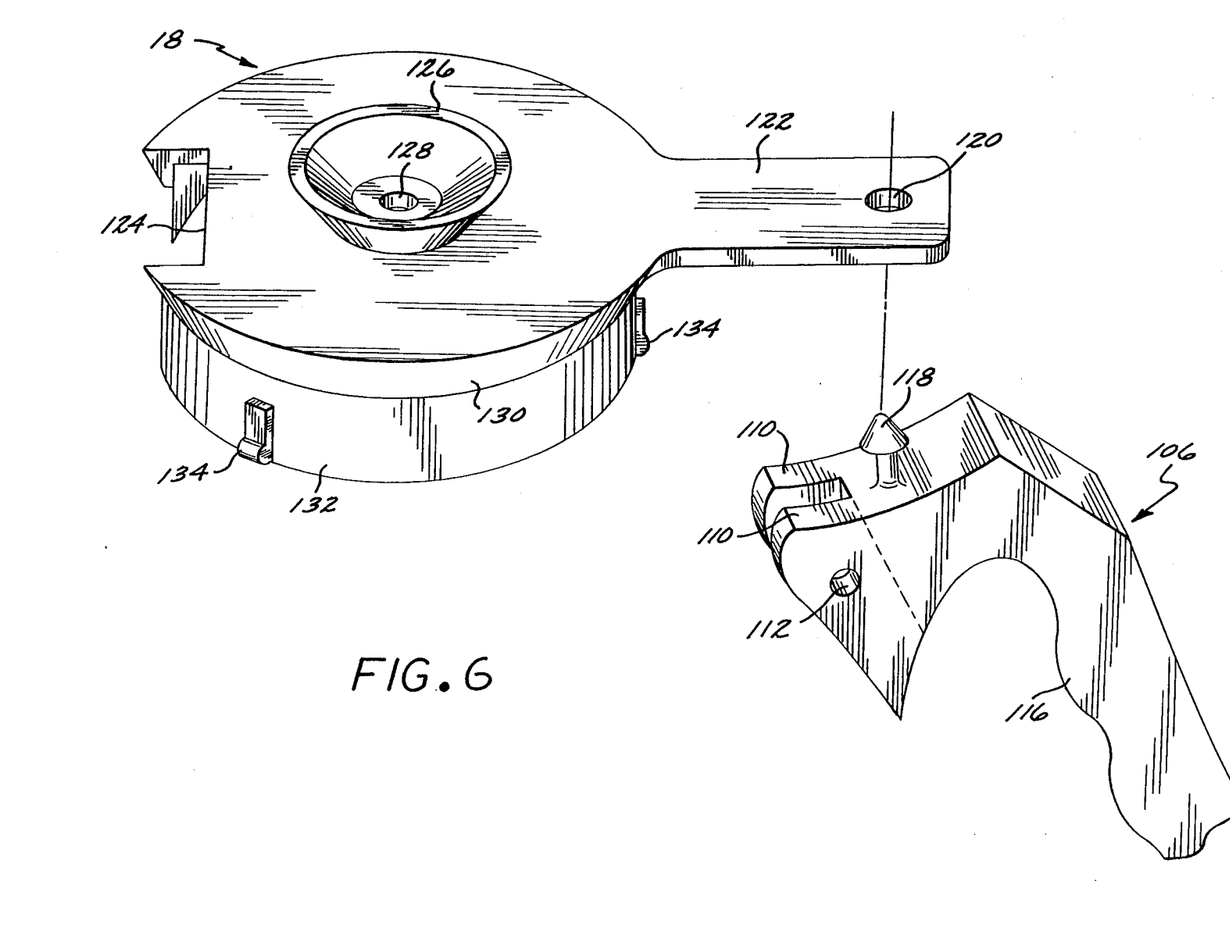
FIG. 6 is an exploded perspective view of a lid for the decanter of FIG. 5.

The decanter 10 further includes a handle 106 comprised of plastic, for example, such as polypropylene. The handle 106 may be attached to the decanter 10 by a plurality of methods. One method includes forming a boss 108 integral with the polysulfone material of the decanter 10. The boss 108 also includes a horizontal penetration for receiving the handle 106 as is illustrated in FIG. 5. The handle also includes a pair of fingers 110 for receiving the boss 108 therebetween and a horizontal penetration 112 for receiving a mechanical fastener 114 as is illustrated in FIGS. 5 and 6. The handle 106 further includes a rolled grip surface 116 to insure a secure grip while handling the decanter 10.

The preferred method for attaching the handle 106 to the decanter 10 employs a snap head 118 integrally formed on the top of the handle 106 and behind the pair of fingers 110. The snap head is also formed of polypropylene and is designed to mate with a receiver opening 120 located in the end of a molded extension 122 integrally connected to the closure lid 18 as will be discussed hereinafter in reference to FIG. 6.

Another alternative and least desirable method of connecting the handle 106 to the decanter 10 includes employing a metal band about the narrow radius of curvature 100 of the decanter 10. Because the radius of curvature 100 necessarily eliminates the neck that existed on decanters of the past, the metal band must be very narrow. The metal band would terminate in a pair of extension arms (not shown) having a horizontal penetration for capturing the pair of fingers 110 extending from the handle 106. A mechanical fastener would be employed to connect the handle to the pair of extension arms of the metal band. The metal band would be retained in position about the radius of curvature 100 by employing an index point having an indentation for securing the metal band at one location on the decanter 10.

The closure lid 18 is generally planar in nature having a relief 124 for forming a pouring mouth which provides an exit for the coffee along the extended lip 104. The closure lid further includes a funnel-shaped handle 126 which includes a drain hole 128 which functions to permit the droplets of coffee to pass from the retainer assembly 40 of the coffee brewing machine 30 through the closure lid 18 and into the decanter 10. The funnel 126 also functions as a handle for removing and inserting the lid into the top of the decanter.

The planar surface of the lid 18 includes an outer peripheral surface 130 to which is integrally connected a retainer skirt 132, including a plurality of snap retainers 134. The combination of the snap retainers 134 which are integrally molded to the retainer skirt 132 are employed for locking the closure lid 18 to the top of the decanter 10. In practice, the lid is inserted onto the decanter by aligning the relief 124 with the extended lip 104 and forcing the lid 18 down onto the top of the spout 102 until the outer peripheral surface 130 is seated on the spout. The snap retainers 134 provide a sufficient force between the inside of the spout 102 and the retainer skirt 132 to lock the lid in place.

In the preferred method of attachment of the handle 106, the snap head 118 which is integrally molded to the handle is aligned with the receiver opening 120 located in the molded extension 122 of the closure lid 18. After the snap head 118 is securely seated into the receiver opening 120, the decanter 10 may be moved about by utilizing the handle. Because the retainer skirt 132 is securely attached to the inside of the decanter 10 by the pressure applied by the snap retainers 134, the handle 106 is properly secured.

In addition to the preferred embodiment, the lid 18 may be connected to the handle 106 by a mechanical linkage device 138 as is illustrated in FIG. 5. The linkage device may be employed in any of the embodiments of the plastic decanter 10 and may be comprised of a plastic snap strap device that is molded to the lid and fitted with a snap device for locking to the plastic handle by any of a purality of known conventional means. In the alternative, the lid may be connected to the handle by a link chain or metal cable and secured to the lid 18 and the handle 106 by, for example, the mechanical fastener 114.

Figure 7:
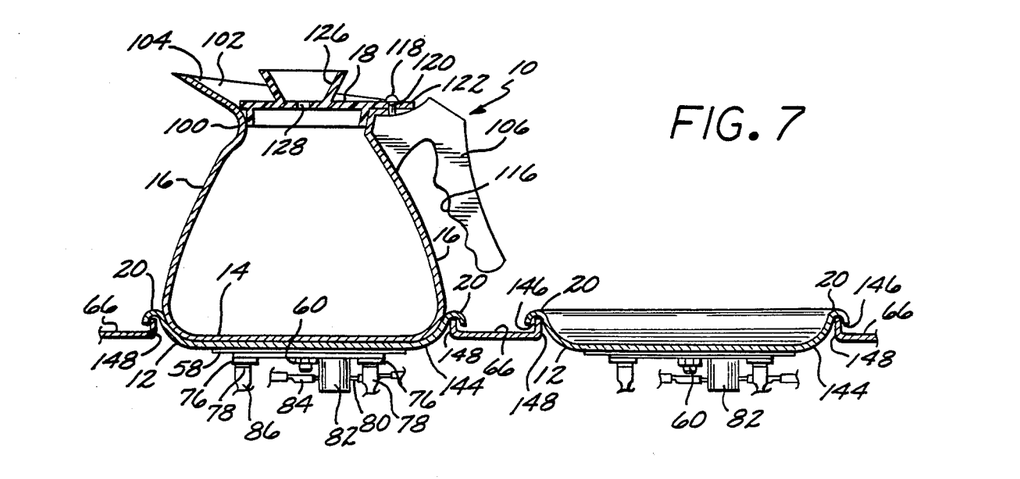
FIG. 7 is a cross-sectional view of the decanter of FIG. 5 mounted upon a warmer plate in accordance with the present invention.

The broad base 14 of the plastic decanter 10 is designed to be congruent with the novel warmer plate 12. The warmer plate 12 has an outer diameter of approximately seven and three-sixteenths inches and is shaped like a pan having a vertical depth of approximately thirteen-sixteenth inches from the rolled lip circumference 20 to a base 144 of the warmer plate 12. The rolled lip circumference of the warmer plate 12 is employed for providing a close interfit between the broad base 14 of the decanter 10 and the warmer plate improving the heat transfer and for forming a gap 146 which is located between the bottom surface of the rolled lip 20 and a vertical edge 148 of the warming deck 66 as is illustrated in FIG. 7. The gap 146 is formed between the warmer plate and the warming deck to provide sufficient air circulation to prevent the warming deck from reaching the temperature of the warmer plate which would result in a safety hazard.

The warmer plate 12 is mechanically connected to the heating element 58 as in the past by the mechanical connector 60. The first source electrical conductor 84 and the second source electrical conductor 86 are circuited into the heating element in a duplicate manner as was described in reference to FIG. 3. The first source electrical conductor 84 connects to the input terminal of the thermostat 82 which is connected to the heating terminal 76 via the terminal end 78 via the switched conductor 80. The second source electrical conductor 86 connects directly to the heating terminal 76 via the respective electrical terminal end 78. Each of the pair of the heating terminals 76 is then designed to be in electrical communication with the heating element 58.

The heating element 58 is toroidal shaped and is fastened to the warmer plate 12 by the fastening device 60. The thermostat 82 is designed to be in the normally closed condition so that upon energizing the coffee brewing machine 30, electrical power is available at the heating element for raising the temperature of the warmer plate. Because of the novel design of the plastic decanter 10, lower heating levels may be employed which results in economy of electrical power and improved longevity of the current carrying circuit elements.

The thermostat 82 remains in the closed position until a temperature of approximately 260° F. is attained. At that temperature, the thermostat is designed to open circuit discontinuing the electrical current flow to the heating element 58. The heating element remains deenergized until the temperature of the warmer plate drops to approximately 230° F. At this point, the thermostat 82 senses the temperature drop and switches to the closed position. Then electrical energy is again supplied to the heating element 58 resulting in raising the temperature of the warmer plate until the upper limit of 260° F. is achieved once again. During the period in which the coffee brewing machine 30 is energized, the thermostat 82 will oscillate from the switched-on to the switched-off position in accordance with the temperature of the warmer plate.

One of the novel features of polysulfone plastic is that it exhibits a lower heat transfer coefficient than is exhibited by glass or metal. As a result, a substantial temperature gradient of the warmer plate 12 exists across the interface of the broad base 14 and the sloping side walls 16 of the decanter 10. The temperature gradient may be as wide as 30° F. which is responsible for the substantial reduction in heat loss of the coffee by thermal convection and other heat transfer processes. Therefore, when the thermostat 82 is in the switched-off position and the temperature of the warmer plate 12 begins to drop toward the lower limit of 230° F., the temperature gradient across the interface of the decanter results in the contents of the decanter being maintained at approximately 18° F.

The coffee brewing machine 30 is designed to heat the water employed for making the coffee to approximately 200° F. As the 200° F. water is permitted to pass through the retainer assembly 40 containing the coffee grounds, the temperature drops to approximately 186° F. The freshly brewed coffee then drains through the retainer assembly into the decanter 10 and cools to approximately 180° F. If the thermostat 82 is in the switched-on position, the temperature of the heating element 58 is increasing resulting in the elevation of the temperature of the contents of the decanter 10. Once the decanter 10 is full of freshly brewed coffee and the heating element is switched-off, the temperature of the warmer plate 12 is approximately (180°–200)° F. Fresh coffee maintained within this temperature range is palatable to coffee drinkers and the higher temperatures associated with glass and metal decanters are eliminated.

At the lower temperatures, the heat tempering problems associated with glass decanters are eliminated. Therefore, the potential of injury to the brewing machine operator when handling an overheated glass decanter is eliminated. The closure lid 18 serves as an energy conservation feature and tends to maintain the coffee temperature without excessive heating and burning. Additionally, the base 144 of the warmer plate 12 in combination with the broad base 14 of the decanter 10 provide a more efficient heat transfer medium which avoids burning the coffee and eliminates the high temperatures normally encountered with glass and metal decanters.

Figure 8:
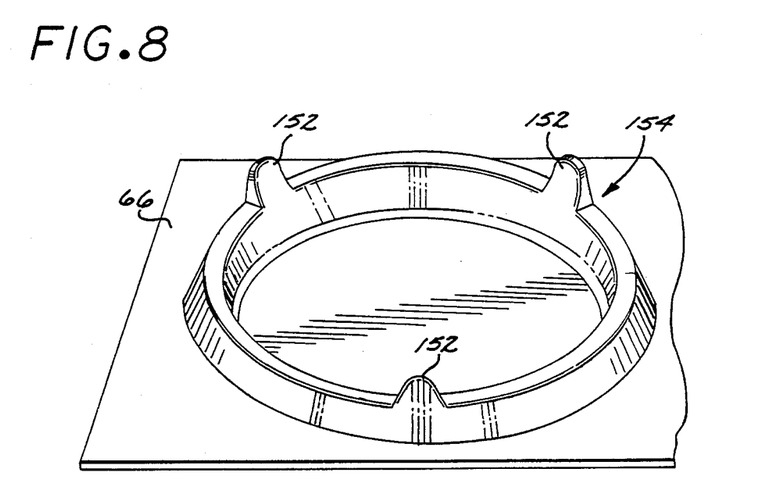
FIG. 8 is a perspective view of a vertical support ring of the warmer plate of FIG. 7.

The warmer plate 12 with the heating element 58 bolted thereto is mounted on a plurality of support knobs 152 which are formed on a vertical support ring 154 that is positioned on the warming deck 66. The plurality of support knobs 152 act as support points for the warmer plate 12 and the heating element 58 as is illustrated in FIG. 8. The remainder of the vertical support ring 154 is open for permitting excessive heat to escape by laminar flow through the gap 146 located between the vertical edge 148 of the warming deck 66 and the rolled lip 20 of the warmer plate 12. The vertical support ring 154 is comprised of any suitable material known in the art such as metal and has a diameter sufficiently wide to support the base 144 of the warmer plate.

Figure 9:
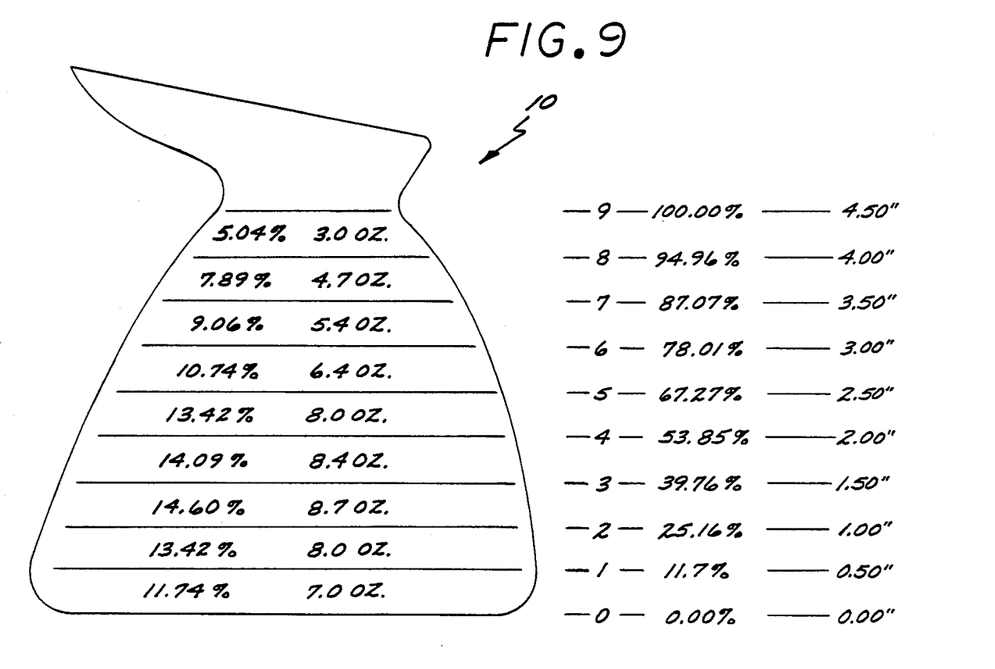
FIG. 9 is a side elevational view of the decanter of FIG. 5.

Although the new plastic decanter 10 has a broad base 14, its useful height for containing fluid is only 4.5 inches. However, 4.5 inches of useable height contains approximately 59.6 ounces of coffee while the decanters of the past as illustrated in FIG. 4 contains approximately 60.7 ounces of coffee. As a result, there are only nine stations for the decanter 10 with each station representing one-half inch of height as compared to ten stations of the decanter of the past. Note that for stations one through four, the new plastic decanter 10 as illustrated in FIG. 9 contains a higher percentage of coffee per station than do the corresponding stations of the decanter of the past as illustrated in FIG. 4. Only upon reaching stations four through seven does the volume per station of the decanter of the past exceed the corresponding volumes of the new decanter 10 as is illustrated in FIG. 3.

The data disclosed in FIGS. 3 and 9 clearly show that a higher volume of the coffee is in the lower portion of the conically-shaped decanter 10. Therefore, the new design permits a more efficient heating distribution across the base 144 of the warmer plate 12 and the broad base 14 of the decanter 10. Because lower heats are permissible with the new design, coffee is less likely to be burned resulting in a distortion of flavor pervasive throughout the coffee. Although the new plastic decanter 10 is actually shorter in useable height, the volume of coffee contained within the new decanter is approximately equivalent to the volume available in the spherical decanter of the past.

With the exception of the novel design of the plastic decanter 10 and the corresponding warmer plate 12, the remainder of the coffee brewing machine 30 is as previously disclosed in the prior art. The improvements to the decanter and warmer plate permit the coffee brewing machine to operate at lower temperatures resulting in an energy efficient operation and prolonged life to electrical heating components.

From the foregoing, it will be appreciated that the plastic decanter 10 and the warmer plate 12 of the present invention permit a reduction in the required heat level to be generated by the heating element 58, and increases the heating efficiency of the decanter-warmer plate interface by providing a broad base 14 and inward sloping side walls 16 for the decanter which closely interfits with the concave shape of the warmer plate and by providing a closure lid 18 for reducing the heat loss to the ambient air. Further, the plastic decanter construction is relatively unbreakable, the broad base heating surface of the decanter permits the mass of coffee to be closer to the heating element, requires that the warmer plate be heated only to 260° F. and maintains the coffee fresh an extended period of time by reducing the convection heat losses through the side walls of the decanter.

While a particular form of the invention has been illustrated and described, it will be apparent that various modifications can be made without departing from the spirit and scope of the invention. Accordingly, it is not intended that the invention be limited, except as by the appended claims.

I claim:

1. A plastic decanter apparatus for retaining a volume of coffee on a warmer plate comprising, in combination:

means for containing said coffee, said containing means having a broad base and a continuous inward sloping side wall terminating in a narrow radius of curvature;

means for pouring said coffee, said pouring means in communication with said containing means through said narrow radius of curvature and forming an extended lip for directing said poured coffee;

means for closing said containing means, said closing means including a lid having a relief portion for passing said coffee and further including an integrally molded retainer skirt for securing said closing means within said pouring means, said closing means further including a handle for removing said closing means from said pouring means and a drain aperture for receiving coffee droplets from a coffee brewing machine; and means for transporting said containing means, said transporting means including a locking means in mechanical communication with said containing means for moving said plastic decanter apparatus, said plastic decanter apparatus having a low heat transfer coefficient for minimizing convection heat losses through said broad base and said inward sloping side walls with a larger percentage of said volume of coffee being retained closer to said broad base for permitting use of lower warmer plate temperatures.

2. The plastic decanter apparatus of claim 1 wherein said plastic decanter is comprised of polysulfone.

3. The plastic decanter apparatus of claim 1 wherein said container means is comprised of a singular piece of polysulfone.

4. The plastic decanter apparatus of claim 1 wherein said container means comprises a conical shape.

5. The plastic decanter apparatus of claim 1 wherein said closing means further includes a plurality of snap retainers integrally molded to said retainer skirt for locking said closing means within said pouring means.

6. The plastic decanter apparatus of claim 1 wherein said pouring means comprises an extension of said containing means for forming said extended lip, fsaid extended lip being inclined and tapering down in height from a forward section to a rearward section.

7. The plastic decanter apparatus of claim 1 wherein said handle of said closing means is funnel shaped and said drain aperature is formed through said funnel shaped handle.

8. The plastic decanter apparatus of claim 1 wherein said locking means comprises a molded extension integrally connected to said closing means and having an opening for receiving a snap head integrally molded to said transporting means.

9. The plastic decanter apparatus of claim 1 wherein said locking means comprises a pair of fingers connected to said transporting means, said fingers capturing a protuberance extending from said containing means with said fingers being fastened to said protuberance.

10. The plastic decanter apparatus of claim 1 wherein said locking means comprises a metal band surrounding said containing means and fastened to said transporting means.

11. A coffee heating apparatus comprising, in combination:
    means for containing a volume of coffee, said containing means being comprised of plastic and having a broad base and a continuous inward sloping side wall terminating in a narrow radius of curvature forming an extended lip for directing the pouring of said coffee;
    means for closing said containing means, said closing means including a lid having a relief portion for passing said coffee and including an integrally molded retainer skirt for securing said closing means within said containing means, said closing means further including a handle for removing said closing means from said containing means;
    means for transporting said containing means, said transporting means including a locking means in mechanical communication with said containing means for moving said containing means;
    warmer means for receiving said containing means, said warmer means being concave shaped to closely interfit with said broad base of said containing means for increasing the heat transfer surface between said containing means and said warmer means and for minimizing heat losses, said warmer means and for minimizing heat losses, said warmer means being in thermal communication with a heating means for transferring heat from said heating means to said coffee within said containing means, said containing means having a low heat transfer coefficient for minimizing convection heat losses through said broad base and said inward sloping side walls, with a larger percentage of said volume of coffee being retained closer to said broad base for permitting use of lower heating temperatures.

12. The coffee heating apparatus of claim 11 wherein said closing means further includes a drain aperture for receiving droplets of said coffee from a coffee brewing machine.

13. The coffee heating apparatus of claim 12 wherein said drain aperture is centrally located within said handle on said closing means, said handle being funnel shaped.

14. The coffee heating apparatus of claim 11 wherein said heating means includes a thermostat for controlling the temperature of said heating means.

15. The coffee heating apparatus of claim 11 wherein said warmer means is suported by a plurality of support knobs extending from a vertical support ring.

16. The coffee heating apparatus of claim 15 wherein said concave shaped warmer means includes a rolled lip circumference, said rolled lip circumference being suspended above a warming deck surrounding said warmer means and forming a gap for limiting the warming deck temperature.

17. A method for heating coffee at low temperatures, said method comprising the steps of:
    containing a volume of coffee within a plastic enclosure having a broad base and a continuous inward sloping side wall terminating in a narrow radius of curvature, a large percentage of said volume of coffee being retained close to said broad base;
    closing said plastic enclosure by providing a lid for retaining the heat of said coffee, said closing lip secured within said plastic enclosure by a retainer skirt compressively locked to said plastic enclosure;
    interfitting a warmer plate to said broad based plastic enclosure for minimizing the heat loss and for increasing the heat transfer surface between said warmer plate and said plastic enclosure; and
    heating said plastic enclosure on said warmer plate for transmitting heat to said volume of coffee, said plastic enclosure having a low heat transfer coefficient for reducing convection heat losses through said broad base and said inward sloping side walls for permitting use of lower heating temperatures.

18. The method of claim 17 further including the step of forming an extended lip above said radius of curvature for directing the pouring of said volume of coffee.

19. The method of claim 17 further including the step of providing a relief in said closing lid for pouring said volume of coffee while said plastic enclosure is fitted with said closing lid.

20. The method of claim 17 further including the step of providing a handle connected to said plastic enclosure for transporting said volume of coffee.

21. A coffee maker comprising, in combination:
    a brewing and dispensing unit for brewing and discharging coffee;
    a decanter comprised of heat resistant thermal insulative plastic for receiving coffee discharged from said brewing and dispensing unit, said decanter having a broad base and a continuous inward sloping side wall terminating in a narrow radius of curvature;
    a warmer deck in communication with said brewing and dispensing unit for receiving said decanter and for maintaining the brewed coffee warm therein;
    a heat conductive warmer plate mounted on said warmer deck, said warmer plate having a deep dish construction including a bottom surface and a raised peripheral wall, said peripheral wall configured for complementary receiving said broad base of said decanter for enhancing heat conduction thereto, said plastic decanter having a low heat transfer coefficient for minimizing convection heat losses through said broad base and said inward sloping side walls; and
    a heating element in thermal communication with said bottom surface of said warmer plate wherein said decanter is positioned with said broad base nested in said warmer plate in direct contact with said raised peripheral wall for providing direct heat conduction from said warmer plate to said broad base with a larger percentage of said coffee being retained closer to said broad base for permitting use of lower warmer plate temperatures.

* * * * *

UNITED STATES PATENT AND TRADEMARK OFFICE
CERTIFICATE OF CORRECTION

PATENT NO. : 4,825,757
DATED : May 2, 1989
INVENTOR(S) : Arthur L. Stoner

It is certified that error appears in the above-identified patent and that said Letters Patent is hereby corrected as shown below:

Col. 1, line 59, delete "headed" and insert --bead--;

line 67, delete "head" and insert --bead--;

Col. 6, line 8, delete "decenter" and insert --decanter--;

line 9, delete "was" and insert --were--;

line 27, delete "head" and insert --bead--;

line 40, delete "platic" and insert --plastic--;

Col. 7, line 26, delete "when" and insert --which--;

Col. 8, line 66, delete "pecentages" and insert --percentages--;

Col. 9, line 57, delete "decenter" and insert --decanter--;

Col. 12, line 43, delete "of the warmer plate 12";

UNITED STATES PATENT AND TRADEMARK OFFICE
CERTIFICATE OF CORRECTION

PATENT NO. : 4,825,757
DATED : May 2, 1989
INVENTOR(S) : Arthur L. Stoner

It is certified that error appears in the above-identified patent and that said Letters Patent is hereby corrected as shown below:

Col. 12, line 45, after "gradient" insert --of the warmer plate 12--;

line 54, delete "18°" and insert --180°--;

line 65, delete "contents of the decanter 10" and insert --warmer plate 12--;

line 68, delete "warmer plate 12" and insert --contents of the decanter 10--;

Col. 15, line 3, delete "fsaid" and insert --said--;

line 41, after ";" insert --and--;

lines 47 and 48, delete "said warmer means and for minimizing heat losses,".

Signed and Sealed this

Sixteenth Day of January, 1990

*Attest:*

JEFFREY M. SAMUELS

*Attesting Officer*    *Acting Commissioner of Patents and Trademarks*